April 14, 1953  G. PIELSTICK  2,634,585

MULTICRANKSHAFT ENGINE

Filed July 2, 1949  3 Sheets-Sheet 1

INVENTOR.
GUSTAV PIELSTICK
BY
*Mock & Blum*
ATTORNEYS

April 14, 1953  G. PIELSTICK  2,634,585
MULTICRANKSHAFT ENGINE
Filed July 2, 1949  3 Sheets-Sheet 2

INVENTOR.
GUSTAV PIELSTICK
BY
*Mock + Blum*
ATTORNEYS

April 14, 1953 G. PIELSTICK 2,634,585
MULTICRANKSHAFT ENGINE
Filed July 2, 1949 3 Sheets-Sheet 3
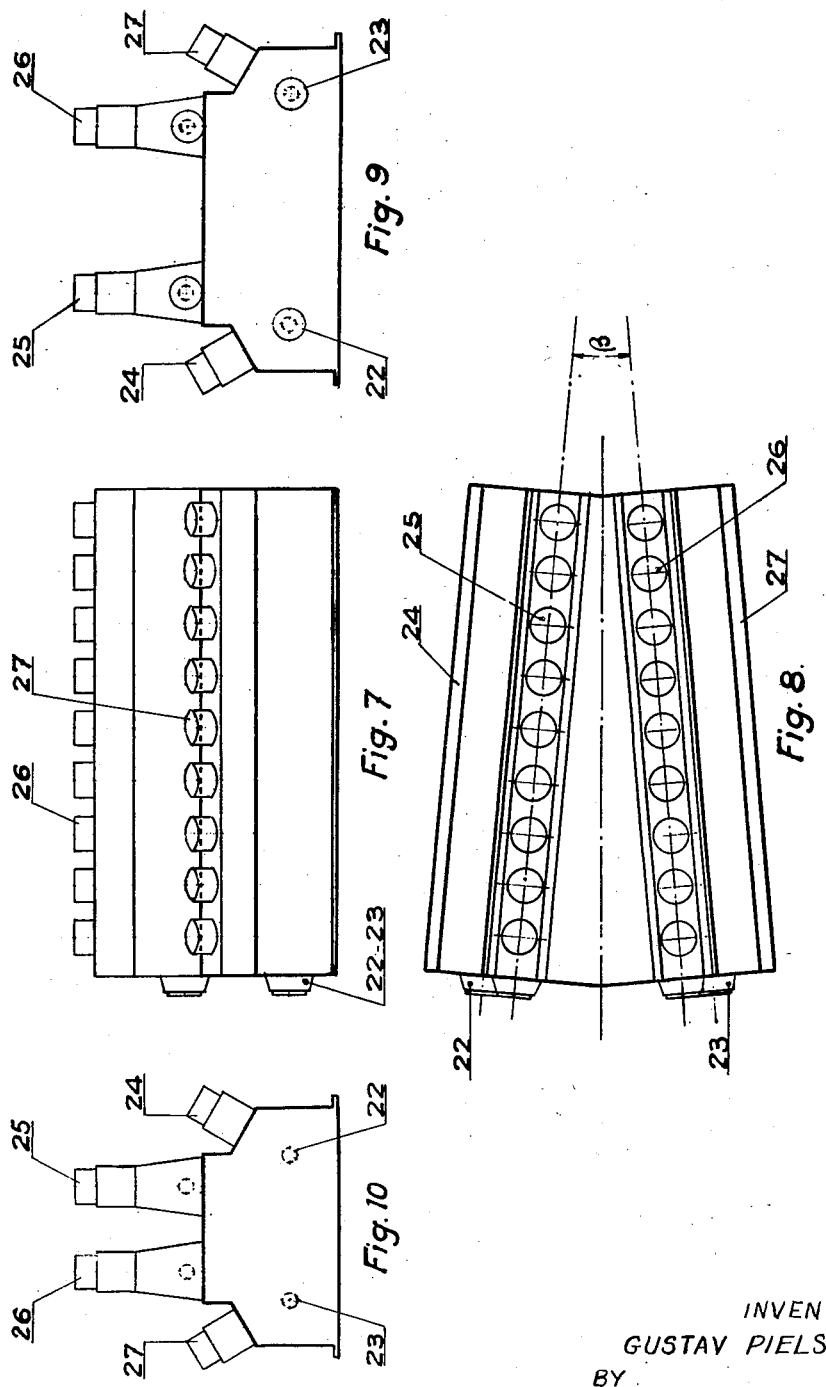
INVENTOR.
GUSTAV PIELSTICK
BY Mock & Blum
ATTORNEYS Patented Apr. 14, 1953

2,634,585

UNITED STATES PATENT OFFICE 2,634,585

MULTICRANKSHAFT ENGINE

Gustav Pielstick, Saint-Germain-en-Laye, France

Application July 2, 1949, Serial No. 102,808
In France July 9, 1948

7 Claims. (Cl. 60—97)

This invention generally relates to multi-crankshaft engine structures, and more particularly to such structures especially designed for use as power-plants for the propulsion of ships, locomotives, and the like.

The power units used heretofore for the propulsion of ships, locomotives and similar heavy-weight high-powered vehicles usually involved the use of one or at most two crankshafts within a common crankcase or engine frame. Where the power requirements were particularly high, a plurality of separate engine units, in a number as high as four or higher, were sometimes used to drive a common crankshaft, said individual engine units being coupled as through drive gearings.

However, with the ever-increasing demand for higher and higher power outputs the use of a plurality of separate complete engines as just described would lead to a prohibitive increase in the bulk of the power plant as a whole. It may be indicated in this connection that power-plant arrangements of the types used in aircraft construction are unsuitable, first because the vertical position of the engines relative to the base-plane of the drive-shaft is too high, and also because of a lack of accessibility of the couplings and transmission gears.

The only acceptable solution to the above problem so far suggested, to the applicant's knowledge, is the construction which provides two crankshafts in vertically-spaced parallel relationship and respectively connected with and driven from two V-type engines of similar power-output and adapted to be selectively engaged and disengaged with and from the related crankshafts according to the power-requirements of the power-plant.

However the propulsion of railway trains and ships involves extensive and frequent power variations in service, thus requiring, if economically satisfactory working conditions are to be achieved, a degree of flexibility which it is impossible to attain with the use of only two crankshafts as in the prior arrangements just mentioned, and making it necessary to subdivide the power output of the power plant to a greater extent.

It is an object of this invention to provide an engine construction in which the power-output of the engine may be subdivided into a plurality of fractions and any selected number of such fractions effectively used in service according to momentary power requirements, thus providing a power-plant of great flexibility.

Another object of the invention is to provide a multi-crankshaft power unit which may readily be constructed in the form of a unitary compact structure in very high power-ranges the attainment of which heretofore had required the use of several independent power units coupled together.

It is a further object of this invention to provide a novel arrangement of, and relationship between, a plurality of crankshafts and a plurality of banks of cylinders in a high-powered combustion engine, whereby a remarkably simple, compact, flexible, and generally efficient power-plant may be produced.

Another object lies in the provision of such a multi-crankshaft engine in which any two or more of said crankshafts may be angled with respect to one another in a horizontal or/and a vertical plane.

A more specific object of the invention is to provide such an engine construction more particularly designed for use in connection with naval requirements, and in which provision may be readily made for the selective drive of fore and aft-screws together or separately.

Further important objects and advantages of the invention will appear as the disclosure proceeds.

According to my invention, I provide an engine structure which essentially comprises a plurality of laterally-spaced crankshafts, and a plurality of related banks of cylinder-and-piston units, each of said banks of cylinder-and-piston units being arranged to actuate the related one of said crankshafts. The cylinder units are preferably equal in number as from one bank to another and accordingly the corresponding crank-throws of the respective crankshafts are generally located in common transverse planes. While the crankshafts may be generally parallel with one another they may according to an important feature of the invention be angled with respect to one another, or some of the crankshafts may be parallel and others variously angled. While conveniently the cylinders may be arranged with their axes vertical, inclined cylinders may also be used, or I may use vertical cylinders in some banks and inclined cylinders in others.

Figure 3:
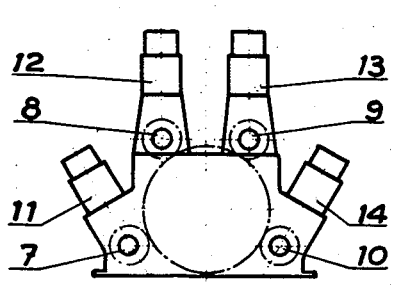
Figure 4:
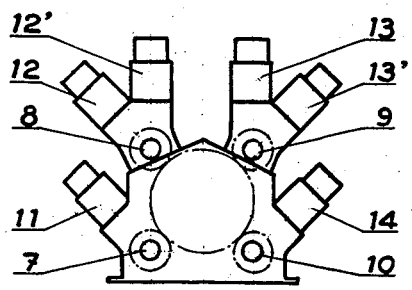
Figure 5:
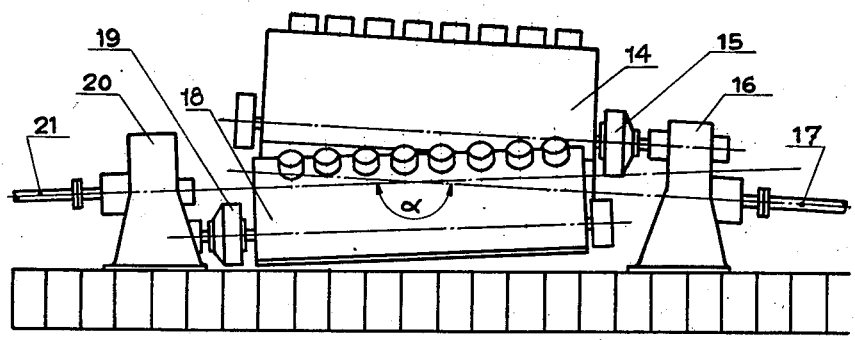
Figure 6:
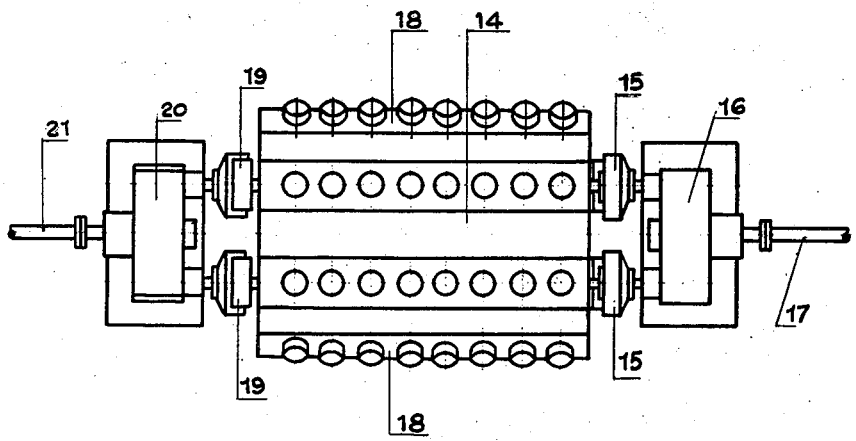

Figs. 3 and 4 respectively are end-views of two modifications of a four-crankshaft engine according to my invention;

Fig. 5 is a side view of an engine unit according to my invention including two crankshafts angled in a vertical plane, and Fig. 6 is a plan view thereof, Fig. 7 is a side view of an embodiment including crankshafts angled in a horizontal plane with respect to each other, and Fig. 8 is a plan view thereof, while Figs. 9 and 10 are respective end views of the power unit shown in Fig. 7.

While the drawings illustrate a few preferred embodiments of engine structures according to this invention, it will be understood that the constructions shown and described hereinafter are not to be construed as exhausting the possibilities and scope of the invention, but rather as illustrative examples only.

Figure 1:
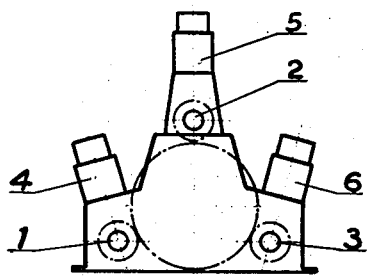
Fig. 1 illustrates an end-view of a three-crankshaft engine according to my invention.

In the example of Fig. 1, the engine unit comprises three laterally-spaced generally parallel crankshafts 1, 2 and 3 which may as shown be positioned with their centres at the respective apices of an equilateral or other triangle, and suitably supported in bearings (not shown) in an engine frame or casing shown in cross-sectional outline in the drawing. Each of the crankshafts has associated with it a bank of cylinders 4, 5 and 6 respectively appropriately mounted on the engine frame and adapted through conventionally operating pistons and piston rods to actuate corresponding crank-throws of the related crankshafts. As shown, there is a top bank 5 of vertically-axised cylinders and two side banks of cylinders 4 and 6 inclined with respect to the vertical.

Figure 2:
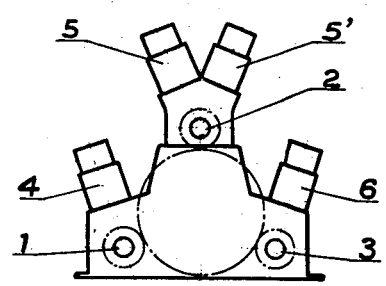
Fig. 2 is an end-view of a modified embodiment of a three-crankshaft engine.

In the modification of Fig. 2, the top crankshaft 2 is actuated from a dual bank of cylinders 5, 5' in V relationship with respect to each other, so that herein all of the cylinders are inclined.

The embodiments illustrated in Figs. 3 and 4 each comprises four crankshafts rather than three. In Fig. 3, the four crankshafts 7, 8, 9 and 10 are arranged with their centres at the apices of a trapezoid and are respectively driven from four banks of cylinders, the two upper banks 12, 13 which drive shafts 8 and 9 being shown vertical while the two lower banks 11, 14 driving shafts 7 and 10 are shown symmetrically inclined. In Fig. 4 there are four crankshafts having their centres at the apices of a square. The lower shafts 7 and 10 are driven from symmetrical banks of inclined cylinders 11, 14 respectively, while the upper crankshafts 8, 9 are each driven from a dual V-bank of cylinders 12, 12' and 13, 13'. The cylinders 12' and 13 are vertical while the cylinders 12, 13' are inclined.

As diagrammatically indicated by the chain-lined circles in each of Figures 1, 2, 3 and 4, each crankshaft may be made to carry a pinion secured thereon, all of said pinions being adapted to mesh with a common gear secured on a common output shaft of the power-plant. It will be understood that in such case the directions of rotation imparted to all of the crankshafts are so correlated as to be all similar i. e. either clockwise or counterclockwise as the case may be.

In the propulsion of ships, it occurs not unfrequently that the screw-shaft is inclined at an angle to the horizontal plane; also there may be more than one screw-shaft forming an angle with respect to one another in a horizontal and/or a vertical plane. Moreover, in certain form of naval construction, such as in ice-breakers, ferry-boats and other craft, there may arise the necessity of providing a selective control for fore- and aft-screws which it may be required to operate separately or together depending on requirements. Figs. 5 and 6 of the accompanying drawings relate to an embodiment of this invention which is more specifically designed for use in connection with such types of craft.

As shown in those figures, there are two output shafts 17 and 21. The output shaft 17 extends from one end of the power plant and the output shaft 21 extends from the opposite end of the plant, and said shafts are connected with fore- and aft-screws. The output shafts 17 and 21 are out of alignment in a vertical plane as shown by the angle α in Fig. 5. Each of the output shafts is driven through suitable clutch couplings 15, 19 and reducer gears 16, 20 from a related pair of crankshafts respectively parallel with the output shafts; each said crankshaft in turn is driven as previously described from a related bank of cylinders 14 and 18. As shown, the two banks of cylinders numbered 14 are adapted to drive the pair of crankshafts actuating output shaft 17, while the two banks of cylinders numbered 18 are adapted to drive the pair of crankshafts relating to output shaft 21. The general shape of the engine assembly is such that the banks of cylinders 14 are generally parallel with their related output shaft 17 while the cylinder banks 18 are parallel with their output shaft 21.

Figs. 7, 8, 9 and 10 relate to a power-plant designed for actuation of two diverging output shafts extending in a common general direction, as is frequently the case in a twin-screw ship with diverging screws. The divergent output shafts are shown at 22 and 23 as contained in a common horizontal plane with their center axes forming an angle β having its apex directed towards the bows of the ship. As shown, the output shafts may be directly coupled with, or form extensions of, crankshafts adapted in turn to be directly driven from the related banks of cylinders 24 and 25. The power-plant shown comprises in addition to said directly-coupled crankshafts two further crankshafts located in a common horizontal plane vertically spaced above the common plane of the first-mentioned crankshafts and output shafts, said additional crankshafts being driven from respective banks of cylinders 25 and 26. As shown, the cylinder bank 25 and its related crankshaft correspond and are parallel with the cylinder bank 24 and its related output shaft 22 and similarly the upper cylinder bank 26 and its related crankshaft correspond and are parallel with the cylinder bank 27 and its output shaft 23. Any suitable disengageable drive gear may be provided to cause each of the upper crankshafts to drivingly actuate the output shaft which is parallel therewith when the full power output is required.

It will be understood that whatever the specific form of the invention used, the power output from each elementary engine unit as constituted by a crankshaft with its related actuating cylinders may be employed in various suitable ways. Thus while Figs. 1 to 4 inclusive show all of the crankshafts of the power plant as adapted to act on a common output shaft and while the embodiments illustrated by Figs. 5 and 6, and by Figs. 7 to 10 inclusive respectively show two pairs of crankshafts each acting on a respective one of two output shafts, various other arrangements could be used. Each of the crankshafts could be made to operate its individual output shaft, and some or all of the crankshafts may be made to operate separate driven units; thus for example, in an embodiment such as that shown in Fig. 3 or 4, two or three of the crankshafts shown may be made to drive a screw of a boat or the wheels of a vehicle in which the power-plant is installed, while the remaining crankshaft or shafts may be allotted to the actuation of auxiliary driven elements, such as an alternator, a compressor, a fan, or the like. Generally speaking, it will be obvious that a great many modifications and additions may be made in and to the invention as hereinabove described and illustrated without exceeding the ambit of the ensuing claims.

What I claim is:

1. A power plant of the multi-crankshaft type comprising a plurality of internal combustion power units, each unit comprising alined cylinders and pistons with a related crankshaft, a frame supporting all of said power units, at least one main output powershaft in said frame and gear means operatively connecting said crankshafts with said powershaft, two of said power units having their crankshafts located below the said powershaft and having their cylinders projecting outwardly of said frame, whereby the plane passing through said projecting cylinders of each of said lower units and its related crankshaft forms an acute angle with the vertical, and at least one further power unit mounted symmetrically with respect to the power shaft and having its crankshaft located above the said power shaft.

2. A power plant according to claim 1 wherein but a single power unit is mounted above said powershaft and has the axis of its crankshaft located in the same vertical plane as the powershaft axis.

3. A power plant according to claim 1 including two uppermost power units mounted symmetrically with respect to the vertical plane passing through the axis of the powershaft.

4. A power plant according to claim 3 wherein the said upper power units are of the V type.

5. A power plant according to claim 1 comprising four power units wherein two powershafts are provided, each of which is operatively connected with the crankshafts of one lower and one upper power units.

6. A power plant according to claim 5 wherein the two powershafts are located in a horizontal plane and form an angle with each other.

7. A power plant according to claim 5 wherein the said two powershafts are located in two distinct vertical planes and are inclined with respect to the horizontal.

GUSTAV PIELSTICK.

References Cited in the file of this patent

UNITED STATES PATENTS

| Number | Name | Date |
| --- | --- | --- |
| 1,101,308 | McSweeney | June 23, 1914 |
| 1,466,394 | Fornaca | Aug. 28, 1923 |
| 2,091,547 | Talbert | Aug. 31, 1937 |
| 2,097,583 | Bogert | Nov. 2, 1937 |
| 2,419,305 | Woolson et al. | Apr. 22, 1947 |

FOREIGN PATENTS

| Number | Country | Date |
| --- | --- | --- |
| 429,805 | France | June 27, 1911 |
| 632,090 | France | Sept. 27, 1927 |